UNITED STATES PATENT OFFICE 2,343,731

PETROLEUM OIL CONVERSION WITH CATALYSTS

James C. Bailie and Melvin J. See, Chicago, Ill., assignors to Standard Oil Company, Chicago, Ill., a corporation of Indiana No Drawing. Application February 5, 1940, Serial No. 317,404

9 Claims. (Cl. 196—52)

This invention relates to the cracking of petroleum oils and the reforming of gasoline and heavy naphtha for the manufacture of motor fuels of high knock rating. More specifically, the invention relates to the catalytic conversion of petroleum hydrocarbons into motor fuels of high knock rating and especially to the cracking of gas oils in the presence of a solid catalyst. The process is characterized by the use of a catalyst made by the combination of certain metal oxides, specifically the oxides of the polyvalent metals of Series 3 of the Periodic System (Mendelejeff).

One object of the invention is to effect the conversion of hydrocarbon oils by the action of catalysts in a manner to produce a maximum yield of gasoline with a high knock rating. Another object of the invention is to effect the conversion of oils with a minimum production of fixed carbon accumulated on the catalyst and a minimum production of fixed gases. Another object of the invention is to provide a catalyst, for the conversion of oils, which has a longer life than most of the catalysts heretofore used and which may be repeatedly regenerated, substantially without loss in activity, by combustion with oxidizing gases at higher temperatures than permissible with many of the catalysts heretofore employed. Still another object of the invention is to provide a method of manufacturing hydrocarbon conversion catalysts of high activity from mixtures of the oxides of magnesium and silicon by intimately combining them in a fine state of subdivision substantially without the use of expensive chemical reagents and substantially without the need of washing to remove undesirable chemical by-products.

In the manufactuer of our catalyst, we may use various forms of magnesia and silica. We may also add alumina, generally in a minor amount, as a promoter. As sources for our magnesia, silica and alumina, we may use bauxite and precipitated alumina, kieselguhr, quartz, silica gel, calcined magnesite, brucite and precipitated magnesia. In general, we prefer to use the chemically reaactive forms of the oxides rather than the massive oxides. We have also found that the temperature of calcination of magnesite affects the catalytic activity of the resulting catalyst. Magnesite calcined at 1,400° F. has been found to give a more active catalyst than the magnesite as ordinarily calcined at about 2,000° F.

In the preparation of our catalyst, we prefer to mix or grind together the oxide ingredients in a mill, for example, a ball mill, in order to effect intimate contact between the particles of the different oxides in the catalyst mixture. Mixing or milling may be done wet or dry but if the mixing is done dry, it is essential to wet the mixture with water later in order to bring about what appears to be a surface reaction between the oxide particles. After mixing, the catalyst is formed into pellets, preferably in the wet or dampened condition. It is not necessary to employ pressure in the pelleting operation but pressure may be used if desired. For example, the catalyst mixture may be pelleted on a pilling machine with high pressure or it may be extruded through a die under high pressure if desired and then finally dried. Final drying may be done at ordinary temperature but preferably at somewhat elevated temperature, for example, 240° F. for 24 hours followed by heating to 1,000° F. for 8 hours.

Our catalyst is distinguished particularly by the unique structure in which the oxide ingredients are present in the form of mechanically fractured particles of microscopic size, mostly within the range of 0.15 to .030 mm. or less. In this way the structure contrasts sharply with that of catalysts in which components are chemically precipitated in the form of submicroscopic crystals whose surface forces are of an entirely different order from those of the surface forces surrounding the mechanically fractured particles present in our catalyst. By preparing the oxide particles of our catalyst by mechanically grinding or milling the larger crystals or masses, we have produced material with a surface of highly unbalanced electronic structure and to this we ascribe the high activity of our catalyst in hydrocarbon conversions.

We believe that our catalyst possesses a heterogeneous structure wherein particles of oxides of silicon and magnesium or silicon, magnesium and aluminum, closely associated in a physical mixture, are separated by spaces through which the hydrocarbon vapors may pass. The points of contact between the oxides, however, probably represent chemical compounds formed by the action of one oxide on the other in the presence of water. The hydrocarbon vapors are accordingly subjected to the action of a variety of surface forces when passing through the interparticle spaces within the catalyst mass. They are subjected not only to the surface forces of the oxides themselves but to the action of a variety of compounds existing between the oxide particles at the points where they contact each other. This theory is advanced to account for the unusual properties of our new hydrocarbon conversion catalysts which possess catalytic powers for conversion far beyond the effect of the separate ingredients. We do not wish our invention to be limited by this theory but offer it only by way of explanation.

The following examples will show the results obtained with a magnesia-silica catalyst in which the magnesia was prepared from magnesite calcined at three different temperatures, 1,000° F., 1,400° F. and about 2,000° F. In making this catalyst a 50% mixture of the calcined magnesite and commercial silica gel was ground in a ball mill, wetted and formed into pellets and dried as described hereinabove. The resulting catalyst was used for the cracking of Mid-Continent gas oil.

|  | Catalyst—SiO₂+ | | |
|---|---|---|---|
|  | Magnesite calcined at 1,000° F. | Magnesite calcined at 1,400° F. | Magnesite calcined at 2,000° F. |
| Temperature_____°F__ | 925 | 925   850   925 | 925 |
| Space velocity_____ | 1.0 | 0.99  1.01  1.0 | 0.97 |
| Duration of run hours__ | 5.0 | 5.0   1.0   1.0 | 5.0 |
| Gasoline volume per cent__ | 25.5 | 33.1  31.0  40.5 | 25.2 |
| Gas__weight per cent__ | 3.8 | 5.8   3.8   9.0 | 5.2 |
| Carbon_____do____ | 0.5 | 0.60  0.57  0.81 | 0.41 |
| Knock rating CFR-M__ | 74.5 | 80.6  79.1  ____ | 79.1 |
| Reid vapor pressure__ | 10.0 | 11.9  11.7  12.1 | 12.3 |

The space velocity referred to is the volume of oil charged per gross volume of catalyst per hour.

The following data show the beneficial effect of water in the preparation of the catalyst. In making this catalyst a mixture of 50% magnesia and 50% silica was employed. The magnesia was obtained by calcining magnesite at 1,400° F. The silica was a commercial silica gel. The ingredients were ground together in a ball mill in the dry form. In the one case the mixture was pelleted dry without a preliminary wetting step, and in the other case the mixture was wetted, dried and then pelleted. Both catalysts were then heated to 1,000° F. for 8 hours before use.

| Catalyst | Pelleted dry | Wetted and dried pelleted |
|---|---|---|
| Stock treated_____ | Mid-Continent gas oil. | Mid-Continent gas oil. |
| Catalyst density_____ | 0.84_____ | 0.78. |
| Gasoline produced____ | 19.0%_____ | 29.5%. |
| Gas_____ | 5.5% by weight_____ | 4.6% by weight. |
| Carbon_____ | 0.95% by weight_____ | 0.94% by weight. |

The higher activity of the wetted catalyst is apparent from the increase in gasoline yield.

As another example of the use of our catalyst in cracking, a catalyst was prepared containing 33⅓% each of silica gel, magnesia and alumina. The ingredients were milled in a ball mill for 8 hours and pelleted wet without pressure. About 30 minutes was required to air dry the pellets. The catalyst was further dried at 240° F. for 24 hours and finally at 1,000° F. for 8 hours. The following data were obtained with this catalyst in a cracking test:

| Stock charged | Mid-Continent gas oil |
|---|---|
| Space velocity_____ | 1.0 |
| Duration of test_____hours__ | 5 |
| Temperature_____°F__ | 925 |
| Density of catalyst_____ | 0.52 |
| Gasoline produced_____per cent__ | 29.3 |
| Gas_____per cent by weight__ | 3.8 |
| Carbon_____do____ | 0.52 |
| Reid vapor pressure_____ | 11.3 |
| Knock rating CFR-M_____ | 79.5 |

When used in the reforming of gasoline to increase the knock rating, our new catalyst will produce high yields of gasoline of about 75 to 85 knock rating, CFR-M when employing a virgin heavy naphtha charging stock having a knock rating of about 30 to 40 CFR-M. In reforming, we prefer to use hydrogen to reduce carbonization of the catalyst and we may use about 1 to 5 mols of hydrogen per mol of naphtha treated at a pressure of about 50 to 400 pounds per square inch and a space velocity of about 0.1 to 2. The temperature employed in reforming will usually be higher than that employed in the cracking of gas oil. For example, in reforming operations, we may employ temperatures of about 900 to 1,025° F. whereas in cracking, temperatures of about 850° to 950° F. are satisfactory.

Although we prefer to prepare our catalyst by mixing the ingredients while grinding to reduce the particle size, we may separately grind the ingredients and mechanically mix them, preferably with water, taking care to obtain a uniform, homogeneous mixture, a paste or a dough, which may then be formed into any desired shape. The proportions of the ingredients used may be stoichiometrical. However, in the case where a promoter oxide is employed, the magnesia and silica will usually be employed in equal molecular amounts and the third oxide may be added in relatively smaller proportions, for example 1/100 to ½ mol. Thus, a catalyst prepared with equal molecular amounts of silica and magnesia may be activated by a small amount of alumina. Instead of mixing the ingredients in equal molecular amounts, we may combine them in other simple molecular ratios such as 1 to 2 and 1 to 3. In the case of the two component magnesia-silica catalyst, we may use from 20 to 80% $SiO_2$ and 80 to 20% magnesia. Other activating elements may be added to our catalyst in small amounts, for example ½ to 10% of the oxides of the Fifth and Sixth Group metals, including vanadium, chromium and molybdenum.

When preparing our catalyst, the degree of subdivision of the ingredients is of primary importance. The oxides should be ground sufficiently for substantially all to pass through a 100 mesh screen and preferably most of the materials should pass through a 200 mesh screen. A large proportion of the ground material will also pass through a 325 mesh screen. In one example, the following screen test results were obtained:

| Screen size | Amount retained |
|---|---|
|  | Percent |
| 150 to 200 mesh_____ | 2 |
| 200 to 300 mesh_____ | 34 |
| 300 mesh and above_____ | 64 |

Assuming the particles to be spherical, the particle size corresponding to the above screen sizes are as follows:

|  | Diameter—mm. |
|---|---|
| 100 mesh_____ | .149 |
| 200 mesh_____ | .074 |
| 300 mesh_____ | .048 |
| 325 mesh_____ | .043 |
| 400 mesh_____ | .030 |

When employing our catalyst in the form of aggregates, such as pellets, we may charge the catalyst to a container or cracking chamber and pass the hydrocarbon vapors therethrough at the desired temperature. Means may be provided for maintaining the temperature during the reaction, and if operating for a period of time, for example, 10 minutes to 5 hours, the operation may be suspended and the catalyst regenerated by burning with an oxidizing gas such as air or air diluted with inert gases. The regenerated catalyst may then be used over again and it has been found that our catalyst will maintain its activity after repeated regeneration. Instead of employing the catalyst in masses, we may, after wet mixing and drying, reduce the catalyst again to the form of a powder by further grinding or crushing and contacting it with hydrocarbon vapors in the form of a suspension. The powder may be added to the oil to be treated either dry or as a water slurry and then the mixture passed through a pipe heater wherein it is heated to the desired cracking temperature; or the catalyst, either dry or in the form of a water or oil slurry, may be introduced directly into the superheated hydrocarbon vapors, for example, gas oil vapors passing from a pipe furnace to a cracking chamber. When using the catalyst in powdered form, it may be separated from the hydrocarbon products by suitable cyclone separators, filters, settling devices, electrostatic precipitators, etc. The recovered catalyst is then burned with an oxidizing gas such as air diluted with inert flue gases and used again in the conversion process.

Having thus described our invention, what we claim is:

1. The process of converting hydrocarbon oils comprising contacting the vapors of said oils at conversion temperatures with a catalyst consisting essentially of a physical mixture of magnesia and silica prepared by intimately mixing magnesia with finely pulverized silicon dioxide, wetting the mixed oxides with water, thereby cementing the particles at their points of contact with an inter-granular material resulting from the action of water on said particles, and drying and igniting the resulting product.

2. The process of claim 1 wherein a majority of the particles of the pulverized oxides are 300 mesh and smaller.

3. The process of claim 1 wherein said catalyst also contains pulverized alumina intimately mixed therein in a small amount sufficient to promote catalytic activity.

4. The process of claim 1 wherein said magnesia is obtained by calcining magnesite at a temperature of about 1,400 to 1,600° F.

5. An improved catalyst for the vapor phase conversion of hydrocarbon oils which comprises an intimate mixture of mechanically fractured particles of magnesia and silica wherein each is present in the proportion of at least 20%, the average dimension of said particles is substantially less than 0.15 mm., and said particles are cemented at their points of contact with an inter-granular material resulting from the action of water on said particles.

6. The process of converting hydrocarbon oils comprising contacting the vapors of said oils at conversion temperatures with a catalyst consisting essentially of a physical mixture of fine particles of magnesia and silica promoted by a small amount of finely divided alumina, said particles of magnesia and silica being cemented at their points of contact with an inter-granular material resulting from the action of water on said particles.

7. The process of converting hydrocarbon oils comprising contacting the vapors of said oils at conversion temperatures with a catalyst consisting essentially of a physical mixture of fine particles of magnesia and silica promoted by a small amount of an oxide of a VIth group metal, said particles of magnesia and silica being cemented at their points of contact with an inter-granular material resulting from the action of water thereon.

8. The process of converting hydrocarbons comprising contacting them at conversion temperatures with a catalyst consisting essentially of a physical mixture of magnesia and silica prepared by intimately mixing at least 20 percent of magnesium oxide with silicon dioxide, both in the form of fine particles, wetting the mixed oxides with water, thereby cementing the particles at their points of contact with an inter-granular material resulting from the action of water on said particles and drying and igniting the resulting product.

9. The process of converting hydrocarbons comprising contacting them at conversion temperatures with a catalyst consisting essentially of a physical mixture of magnesia and silica particles prepared by intimately mixing about 20 to 50 percent of finely divided magnesia with finely divided silica and activating said mixture with water whereby said magnesia and silica particles are cemented into a heterogeneous structure, and thereafter drying and igniting the resulting product.

JAMES C. BAILIE.
MELVIN J. SEE.